(12) United States Patent
Nelson et al.

(10) Patent No.: US 8,757,008 B1
(45) Date of Patent: Jun. 24, 2014

(54) POWERED CAPTURE HOOD

(71) Applicants: Gary Nelson, Minnespolis, MN (US); Ron Rothman, Minneapolis, MN (US)

(72) Inventors: Gary Nelson, Minnespolis, MN (US); Ron Rothman, Minneapolis, MN (US)

(73) Assignee: The Energy Conservatory, Inc., Minneapolis, MN (US)

(*) Notice: Subject to any disclaimer, the term of this patent is extended or adjusted under 35 U.S.C. 154(b) by 0 days.

(21) Appl. No.: 13/627,309

(22) Filed: Sep. 26, 2012

Related U.S. Application Data (60) Provisional application No. 61/626,454, filed on Sep. 26, 2011.

(51) Int. Cl.
*G01F 1/34* (2006.01)
*G01F 1/00* (2006.01)

(52) U.S. Cl.
USPC .......................... 73/861.42; 73/861

(58) Field of Classification Search
USPC ............................... 73/861.42, 861
See application file for complete search history.

(56) References Cited

U.S. PATENT DOCUMENTS

| | | | | |
|---|---|---|---|---|
| 5,312,297 | A * | 5/1994 | Dieckert et al. | 454/238 |
| 6,142,142 | A * | 11/2000 | Woodall et al. | 126/299 R |
| 6,439,061 | B1 * | 8/2002 | Nelson et al. | 73/861.65 |
| 6,705,937 | B2 * | 3/2004 | Huang et al. | 454/49 |
| 6,923,072 | B2 * | 8/2005 | Modera et al. | 73/861 |
| 7,174,791 | B2 * | 2/2007 | Modera et al. | 73/861 |
| 7,699,051 | B2 * | 4/2010 | Gagas et al. | 126/299 D |
| 7,891,573 | B2 | 2/2011 | Finkham et al. | |
| 8,054,018 | B2 | 11/2011 | Jeung | |
| 2003/0154803 | A1 * | 8/2003 | Modera et al. | 73/861.52 |
| 2005/0241293 | A1 * | 11/2005 | Modera et al. | 60/226.1 |
| 2006/0130663 | A1 * | 6/2006 | Joshi et al. | 96/224 |
| 2006/0278216 | A1 * | 12/2006 | Gagas et al. | 126/299 D |
| 2013/0190931 | A1 * | 7/2013 | Secor | 700/276 |

OTHER PUBLICATIONS

Observator Instruments, DIFF Automatic brochure, Ridderkerk, The Netherlands.
Acin Instruments BV, FlowFinder brochure, version EN0508, Rijswijk, The Netherlands.
Airflow Lufttechnik GmbH, DIFF Automatic brochure, Rheinbach, Germany.
The Energy Conservatory, Minneapolis Duct Blaster Operation Manual (Series B Systems), Nov. 2003, pp. 63-67, Minneapolis, MN USA.

* cited by examiner

*Primary Examiner* — Lisa Caputo
*Assistant Examiner* — Jamel Williams
(74) *Attorney, Agent, or Firm* — Eggink & Eggink; Anthony G. Eggink; Katrina M. Eggink (57) ABSTRACT

A powered capture hood assembly to measure volumetric airflow in heating and cooling systems and for ventilation fans. The capture hood assembly has a hood for capturing or providing airflow, a formed nozzle structure attached thereto for conditioning the airflow and a blower apparatus with an adjustable fan attached to the opposite end of the nozzle structure. Subsequent the positioning of the hood over a supply duct, for example, a fan speed controller is utilized to adjust the fan in the tubular blower member to provide a zero or null pressure reading between the venturi portion of the nozzle structure and the local ambient room pressure. A pressure gauge is utilized to measure the pressure differential between a pressure reference tap of the formed nozzle structure and the pressure tap of the blower apparatus to determine volumetric airflow.

20 Claims, 5 Drawing Sheets

POWERED CAPTURE HOOD

This Application claims the benefit of U.S. Provisional Patent Application Ser. No. 61/626,454 having a Filing Date of Sep. 26, 2011.

BACKGROUND OF THE INVENTION

The present invention relates generally to airflow measuring assemblies. Particularly, the invention relates to powered capture hood assemblies to measure volumetric airflow. More particularly, the invention relates to a unitary powered capture hood assembly to measuring supply and return volumetric airflows in heating and cooling systems and ventilation fans, for example.

Heating, ventilating and air conditioning systems (HVAC) depend upon ductwork to deliver air from the air handler (typically part of the furnace or air conditioner) to individual rooms or spaces. Air delivery typically depends on duct sizing, construction and leakage and thus, measuring the air flow at each supply register and return air provides a means for the HVAC contractor to determine if the HVAC system is supplying proper airflow to a specified area and to the system. In residential HVAC systems, particularly due to the type and placement of the ductwork, accurate airflow measurements and balancing room to room flow as well as matching supply and return airflow help provide optimal comfort for the homeowner. However, because of the inherent ductwork construction, residential HVAC systems are difficult to measure by prior art devices.

Due to the increased desire for efficient heating, cooling and ventilation systems, it has become imperative that more accurate airflow measurement readings be achieved. Various measuring devices and assemblies have been used and proposed in the past to measure airflow in residential and commercial heating and cooling systems. However, these prior art devices have typically been passive devices and have been cumbersome and difficult to utilize in obtaining accurate airflow measurements. Other prior art devices have utilized flexible duct structures which required the on-site construction of flow boxes for use with a powered blower to measure airflow. The latter devices are difficult and time consuming to construct and utilize. The powered capture hood of the present invention overcomes the difficulties and limitations of prior art devices.

The powered capture hood of the invention provides the necessary flow conditioning and compensation for pressure loss to provide accurate airflow measurements. The powered flow capture assembly of the invention provides an easy to use assembly which yields accurate volumetric airflow measurements.

SUMMARY OF THE INVENTION

A powered capture hood assembly to measure volumetric airflow for heating and cooling systems, ventilation fans and the like. The powered capture hood assembly comprises a hood structure constructed to capture airflow at one end from a supply air duct or to provide airflow into a return duct, for example. A formed nozzle structure is mounted to the opposite end of the hood structure. The nozzle structure is formed having flared ends and has a venturi shape or constricted middle section with Return and Supply sensors in communication with Return and Supply taps, respectively, the latter being accessible on the outside of the nozzle structure. The formed nozzle structure has an airflow conditioning assembly mounted adjacent one flared end as well as a pressure sensor which communicates with a pressure reference tap which is accessible on the exterior of the nozzle structure.

A blower apparatus having an adjustable fan mounted therein is attached to the other end of the nozzle structure (end opposite the hood structure) and a fan speed controller is provided in communication with the adjustable fan of the blower apparatus. The blower apparatus, such as Applicants' assignee's Duct Blaster® apparatus, which is further described below, is a scientific instrument constructed to measure the volumetric flow rate of a fluid such as air, when passing through the instrument. The blower apparatus may also be provided with a reversible fan/motor assembly so that air may be moved in either direction from the blower apparatus.

The blower apparatus has a pressure sensor and a pressure tap structure extending therefrom to permit a pressure gauge to be attached via tubing to measure the pressure at the pressure sensor of the blower apparatus. A pressure gauge is provided to read pressure differentials between the taps of the formed nozzle structure and the pressure tap of the blower apparatus.

In use, the powered capture hood assembly is held with the capture hood structure positioned over a supply opening of a heating and cooling system or of a ventilation fan, for example, to measure the volumetric supply air. While the air handler of the heating and cooling system is operational, the adjustable fan of the blower apparatus of the powered capture hood assembly is adjusted so that the differential pressure reading at the appropriate Supply or Return tap and the local ambient room pressure is zero. Thereafter, a pressure differential is measured between the reference pressure of the nozzle structure and the pressure at the blower apparatus and converted to volumetric airflow (cfm).

An advantage of the invention is to provide a powered capture hood assembly to easily and accurately measure volumetric airflow in heating and cooling systems and ventilation fans.

Another advantage is to provide a hood structure and a formed nozzle structure which are easily assembled and mounted to a tubular blower apparatus to measure volumetric airflow.

These and other advantages of this invention will become clear from the following description by reference to the drawings.

DESCRIPTION OF THE PREFERRED EMBODIMENTS

Figure 8:
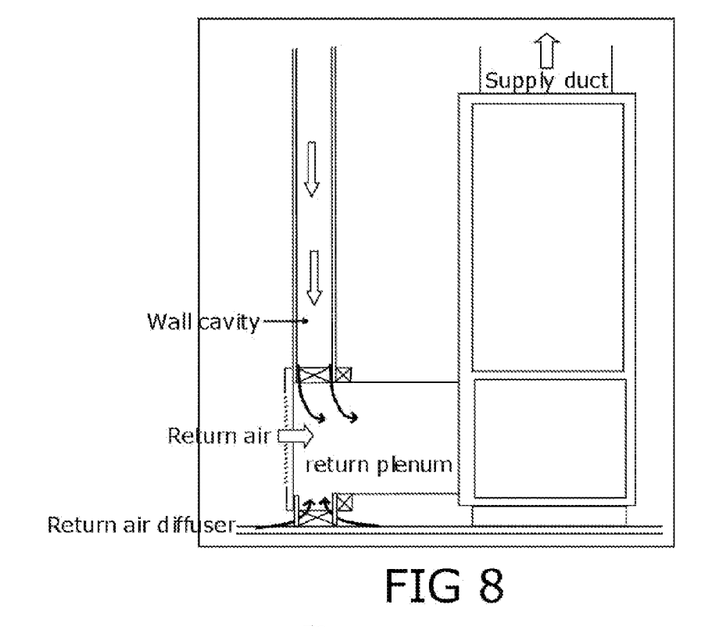
FIG. 8 is a plan view of an air handler system.

The present invention relates to a powered capture hood assembly to measure volumetric airflow provided to air return ducts, and volumetric airflow from air supply ducts of an air handler system as shown in FIG. 8, for example. The powered capture hood assembly is comprised of a formed nozzle structure having flared ends, a Supply pressure tap, a Return pressure tap and a Reference pressure tap. A capture hood structure is mounted on one flared end of the formed nozzle structure to either direct supply air from a supply duct into the nozzle structure or to direct air from the nozzle structure into an air return duct. A blower apparatus having an adjustable fan is mounted to the other flared end of the formed nozzle structure to either direct air into a return duct or to direct air outwardly therefrom to measure volumetric airflow from an air supply duct.

Figure 1:
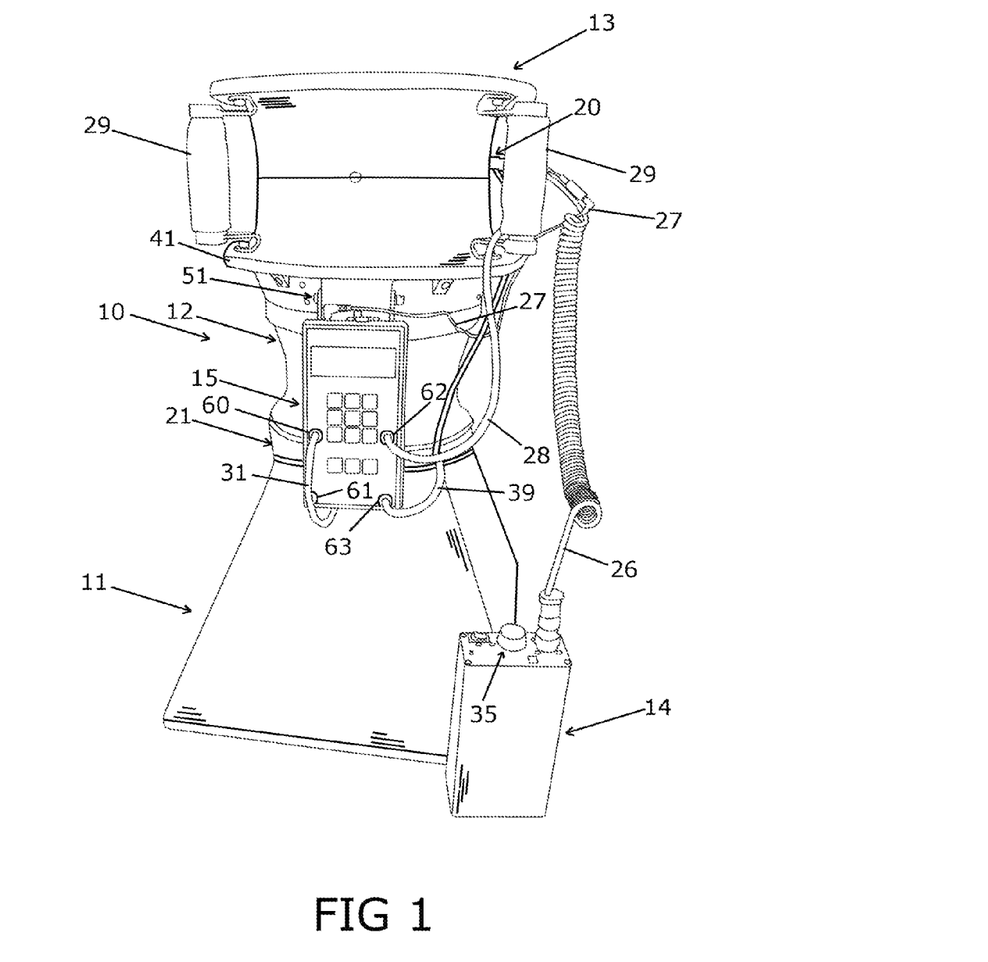
FIG. 1 is a perspective view showing the powered capture hood assembly of the present invention.

Referring to FIG. 1, the powered capture hood assembly 10 of the invention is shown in an assembled state. The formed nozzle structure 12 is shown having the capture hood structure 11 mounted at one flared end. A blower apparatus 13 is shown mounted to the other end of the formed nozzle structure 12. The blower apparatus 13, as shown, has one directional fan rotation, thus requiring one specified end of the blower apparatus to be mounted to the formed nozzle structure 12 for Return or Supply volumetric airflow measurements. It is within the purview of the invention to utilize a blower apparatus having an adjustable fan capable of rotation in both directions.

Figure 2:
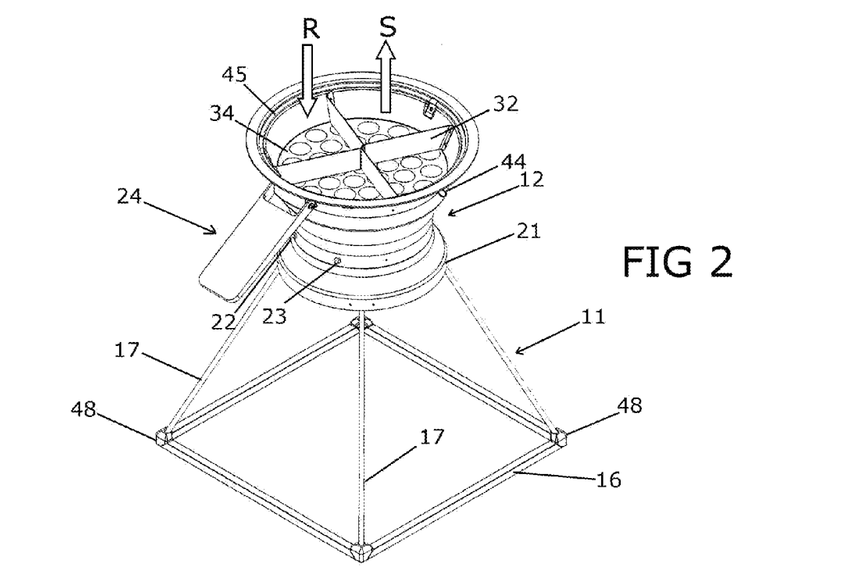
FIG. 2 is a lateral view, partially in section, showing the hood structure and the nozzle structure of the capture hood assembly.
Figure 9:
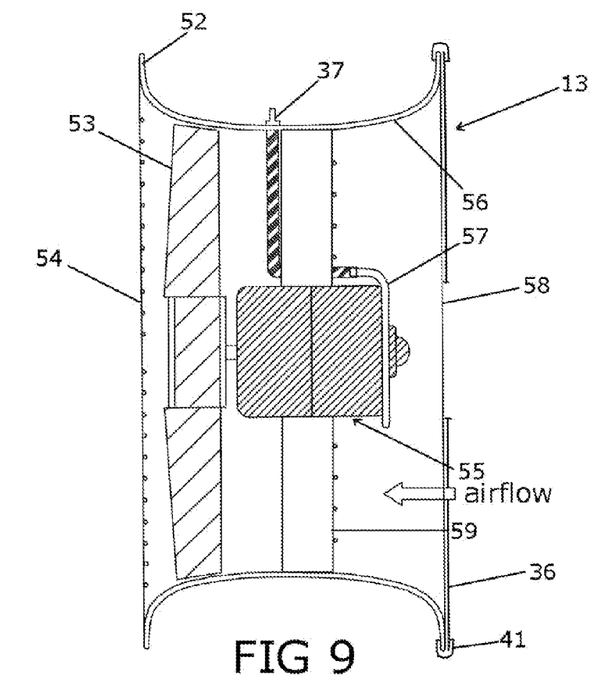
FIG. 9 is a sectional view of a tubular blower apparatus.

Referring to FIGS. 1 and 2, the powered capture hood assembly 10 is shown comprising a capture hood structure 11 adapted to capture airflow from a heating or cooling system supply duct, a ventilating fan or like fluid flow duct and to provide airflow to a return duct of an air handler, for example. A formed nozzle structure 12 is shown attached to one flared end of the capture hood structure 11 opposite that used to capture or provide airflow. A blower member 13 is shown mounted to the opposite flared end of the formed nozzle structure 12. The tubular blower member 13 may be the Duct Blaster® apparatus of The Energy Conservatory, the assignee of the Application for the present invention. The Duct Blaster® apparatus is a testing and measuring apparatus having a motor driven fan used, for example, to measure air leakage rates in ducts and other structures having air passages. Connecting trim 41 or the like may be utilized to mount the blower apparatus 13 to the flared end of the nozzle structure 12. The trim 41 is similar to the connecting trim utilized to mount the flow rings 36 to the blower apparatus as shown in FIG. 9 whereby the flanges 52 or peripheral edges are sandwiched within the trim piece 41.

Figure 5:
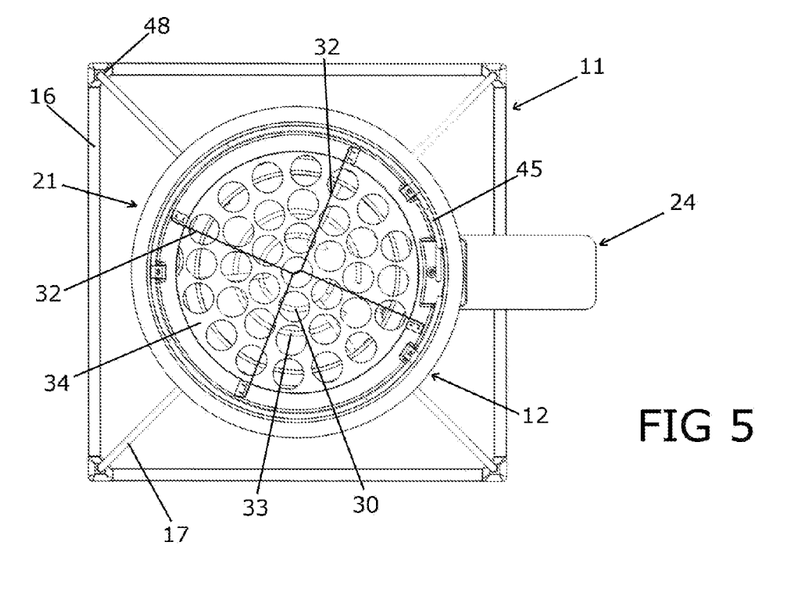
FIG. 5 is a top plan view of FIG. 2.
Figure 6:
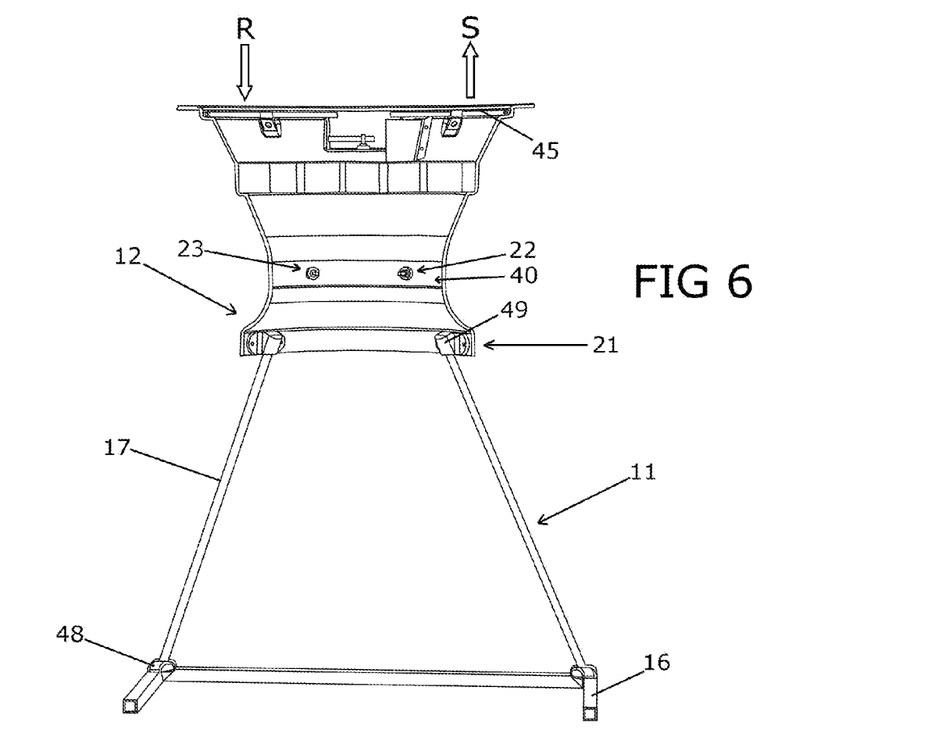
FIG. 6 is a section view of FIG. 2.

Referring to FIGS. 2-5, the formed housing 12 comprises a unitary tapered cylinder with three stainless steel pressure sensing rings 30, 33 and 45. The three sensing rings are connected to three pressure taps 22, 23 and 44 accessible on the outside of the housing 12 and labeled "Fan Reference (Supply)" 44, "Supply" 22 and "Return" 23. The largest diameter ring 45 positioned in a recess of the formed housing 12 provides the reference pressure for the assembly when measuring Supply airflow. A two ring assembly functions as the zero pressure sensor assembly and is positioned in the narrowest interior portion 40 of the formed housing 12 as shown in FIG. 6. The two ring assembly may comprise a five inch diameter ring 33 for measuring Supply airflow and a three inch diameter ring 30 for measuring Return airflow. The pressure measured at the latter location is utilized to detect when the fan of the blower assembly 13 is adjusted to cancel the resistance added by the formed housing structure 12. The coplanar pressure sensors each have equally spaced apertures, approximately 1/32 inches in diameter, which face upstream of the airflow through the formed nozzle structure 12.

Various pressure sensors are known in the art, i.e., sensors using a fluid column, a moving membrane, wire resistance changes, etc. and it is within the purview of the present invention to utilize any such prior art sensors to determine specified pressures and/or differential readings. Regarding the latter, corresponding meters or gauges and corresponding conversion charts may also be utilized in accordance with the particular pressure sensor being utilized in the assembly of the present invention.

Figure 3:
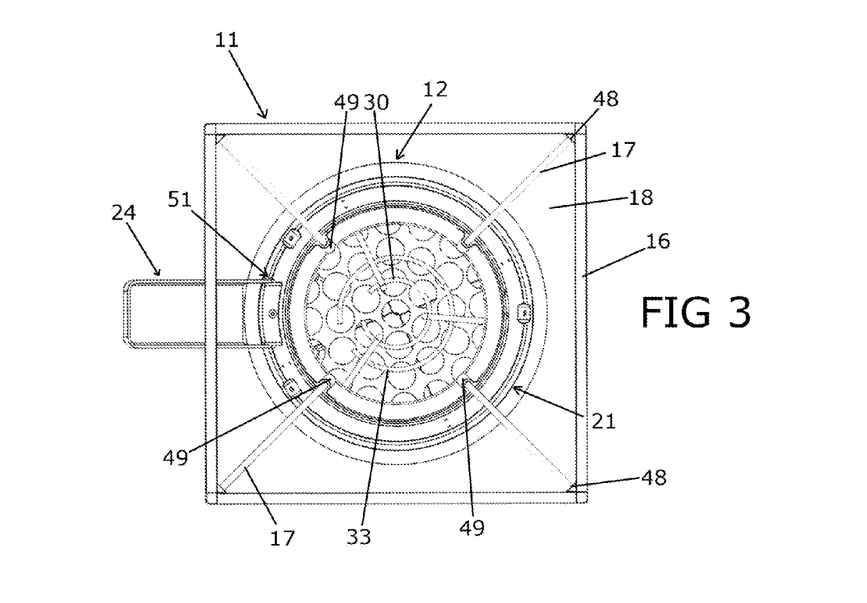
FIG. 3 is a bottom plan view of FIG. 2.
Figure 4:
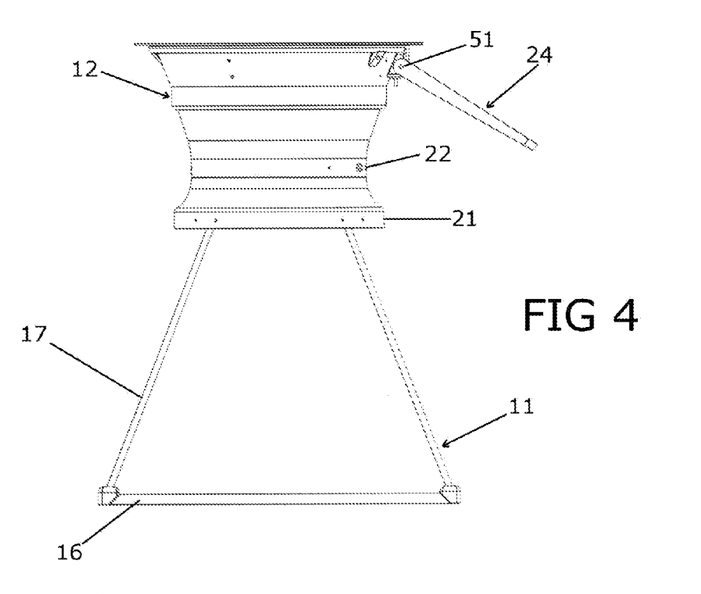
FIG. 4 is a lateral plan view of FIG. 2.

The formed nozzle structure 12 is shown to have a restricted or venturi shape portion where a pair of pressure taps 22 and 23 protrude from the exterior of the nozzle structure 12. The venturi shape 40 of the formed nozzle structure 12 is the location where the return and supply connectors or taps 22 and 23 are positioned. A venturi is generally known as a tubular structure with flared ends connected by a constricted middle section. As shown in FIGS. 3 and 5, the interior of the nozzle structure 12 has pressure sensors which communicate with the respective pressure taps. The apertures in the Supply and Return sensors face in opposite directions.

The interior of the formed housing 12 further includes an airflow conditioning structure which is a combination of a fabricated metal "X" element 32 and a perforated foam disc 34 with a plurality of apertures, approximately one inch in thickness, and which are utilized to straighten, stabilize the airflow pattern and distribute airflow through the housing 12 to improve the accuracy of airflow measurements.

Referring further to FIG. 1, a fan speed controller 14 is shown connected to the blower member 13. A pressure gauge 15 is in communication with pressure taps of the formed nozzle structure 12 and to a pressure tap of the blower member 13. Handle members 29 are shown mounted the outside of the tubular blower member 13 so as to allow a user to position the hood structure 11 of the powered capture hood assembly 10 over a duct to measure volumetric airflow, for example, as is further discussed below under Operation Of The Powered Capture Hood.

The adjustable gauge mounting plate or bracket 24 on the outside of the formed housing 12 is provided to hold a DG-700 digital pressure gauge 15, for example, via Velcro fastening strips that mate with loop strips on the back of the gauge body. The gauge mounting plate 24 may be adjusted for easy viewing of the gauge display when taking airflow measurements. A friction hinge 51 holds the gauge 15 in any position in the range of rotation of the gauge plate 24.

The hood structure 11 may have a generally truncated pyramidal configuration having a rectangular or square periphery 16 which may have a sealing material or gasket facing outwardly. Support members 17 are shown extending upward and attached into the pockets 49 to the flared end of the formed nozzle structure 12. The sides of the hood structure 11 are shown covered by a fabric 18 or like material to provide an air impermeable lightweight structure. In FIG. 2, the capture hood structure 11 is shown mounted to the flared end of nozzle structure 12. Four pole pockets 49 are located on the narrow end of the housing 12 and are provided to hold four flexible poles 17 that form part of the hood assembly 11.

The hood assembly 11 is connected to the formed housing 12 by means of an elastic collar 21 and utilizes four flexible poles 17 with a gasketed aluminum frame 16 or the like. The four frame pieces 16 mounted in molded corner members 48 form a 16 inch by 16 inch frame which forms the open end of the hood assembly 11. A circular elastic collar 21 on the opposite end of the fabric skirt 18 fits over the narrow end of the formed housing 12. Other means may be utilized to attach the fabric skirt 18 or the like to the formed housing 12. The formed housing 12 and hood structure 11 may be provided in a carrying case (not shown) with the fabric skirt portion 18 attached to the formed housing 12. This arrangement only requires that the four flexible poles 17 be inserted into the pole pockets 49 on the inside of the formed housing 12 and the fabric skirt 18 lifted up and the corner members 48 installed onto the ends of the flexible poles 17.

Figure 7:
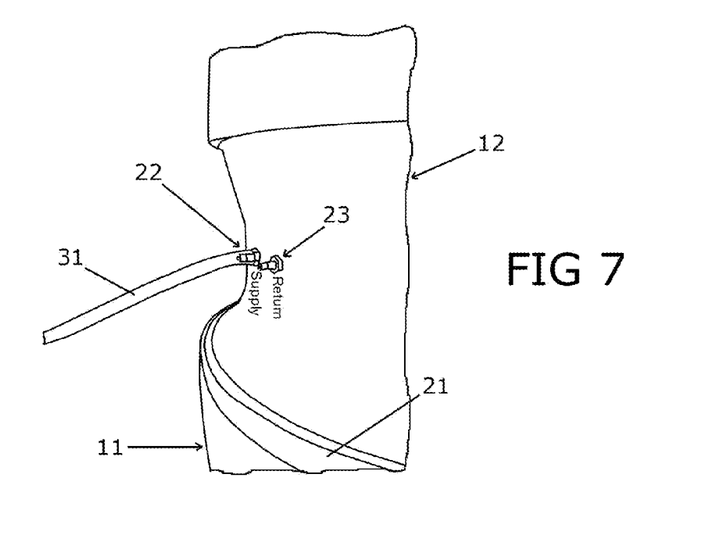
FIG. 7 is a lateral perspective view of the nozzle structure of the powered capture hood of the invention.

The formed nozzle structure 12, such as a formed polymeric structure, is shown having an attachment member 21 (Velcro strip, for example) at one end for permitting the quick attachment of the lightweight hood structure 11. At the opposing end of the formed nozzle structure 12, the blower apparatus 13 is mounted. The blower apparatus 13 likewise is provided with means for attachment to the formed nozzle structure 12, for example, trim pieces 41. As shown in FIG. 7, tubing 31 is connected to the tap or connector 22 marked "Return" and which is shown adjacent to connector 23 marked "Supply," the latter taps are used to provide a Return or Supply null pressure reading as further discussed below.

Referring to FIG. 1, the blower apparatus such as a Duct Blaster® apparatus 13 is shown mounted to one end of the venturi shaped nozzle structure 12. Particularly, the electrical connector assembly 20 is shown mounted to the exterior of the apparatus 13 to provide electrical power to the adjustable fan mounted therein. Cable 26 is shown extending between the electrical connector 20 and the fan speed controller 14 which is shown to have knob 35 and that when rotated adjusts the rpm's of the variable speed fan in the tubular blower member 13. Also shown extending from electrical connection 20 is cable 27 which is connected to the pressure gauge 15.

Referring to FIG. 7, the formed venturi shaped nozzle structure 12 is shown to have a "Return" tap connector 22 and a "Supply" tap connector 23 extending from the formed, nozzle structure 12 at the restricted or venturi section of the nozzle structure 12. Each connector or tap is adapted to receive the end of a flexible tube, such as the end of tubing 31 which is shown connected to the "Supply" tap 22.

In FIG. 2, the pressure reference tap 44 is shown extending from the nozzle structure 12 and the air flow conditioning elements 32 and 34 are shown mounted in one flared end of the venturi shaped nozzle structure 12. A peripherally disposed pressure sensor 45 is shown and is in communication with pressure reference tap 44.

Referring to FIG. 1, the pressure gauge 15 is shown having fan speed control cable 27 and pressure reading tubing 28, 31 and 39 connected thereto. The pressure gauge 15 shown is a DG-700 Pressure & Flow Gauge also provided by The Energy Conservatory and which also has means to automatically control fan speed. The pressure gauge 15 is shown to have Channel A pressure taps, namely, input tap 60 and reference tap 61, and Channel B pressure taps, namely, input tap 62 and reference tap 63. The digital gauge 15 shown is a differential pressure gauge which measures the pressure difference between either pressure Input pressure tap and its corresponding bottom Reference pressure tap. The gauge has two separate measurement channels A and B, which allow the monitoring of the duct system pressure and the fan pressure (airflow) signals. The DG-700 gauge allows for the simultaneous display of both channels and is able to display the volumetric airflow through the Duct Blaster® fan.

The fan speed controller 14 is also a product of The Energy Conservatory and provided with the Duct Blaster® assembly which is controlled by the speed control output of the digital gauge 15 or by the fan speed adjustment knob 35 located on the face of the speed controller 14.

As shown in FIG. 9, the Duct Blaster® fan 13 is comprised of a molded fan housing 56 with an inlet 18 and exit guard 54. The fan structure 13 has a variable speed motor 55 with fan blade 53 mounted therein on mount/inlet guard 59 and which may move up to 1500 cubic feet of air per minute (CFM) at free air conditions. Fan flow is determined by measuring the slight vacuum created by the air flowing over flow sensor 57 attached to the end of the motor. The Duct Blaster® fan 13 can accurately measure flows between 10 and 1,500 CFM. Fan pressure readings from the flow sensor may be converted to fan flow readings by using a conversion table, by reading flow from the digital pressure gauge 15 or through the use of a software program. The Duct Blaster® fan 13 may provide different flow capacity ranges depending upon the configuration of the flow rings mounted at the fan inlet 58. For example, an open flow arrangement may be used for 600-1500 cfm and flow rings to restrict airflow may be utilized for 225-800, 90-300 and 20-125 cfm, respectively.

Referring to FIG. 9, a flow ring 36 may be mounted at the inlet end 58 and to the peripheral flanges 52 of the blower member 13. The flow ring 36 is held to the periphery of the blower member 13 by means of connecting trim 41. The central opening of the flow ring 36 is shown positioned at the inlet of the fan and which is in communication with tubing 31 in FIG. 1 which is connectable to pressure gauge 15 by means of the pressure tap 37.

Operation of the Powered Capture Hood

The powered capture hood 10 of the invention may be used to measure volumetric air flows from supply ducts, exhaust fans and other air flow devices and to measure airflow into the return ducts of an air handler, for example.

Utilizing the Duct Blaster® Apparatus as shown in the drawings, two different configurations are utilized, namely the Supply or outlet configuration and the Return or inlet configuration, which are as follows:

Supply (Outlet) Configuration:
1) The Duct Blaster® apparatus is attached to the flared ends of the nozzle structure such that the motor is towards the nozzle structure and the exit wire finger guard is visually exposed when assembled. In this configuration, the flow rings or flow restrictor elements are sandwiched between the respective flared end of the nozzle and the Duct Blaster® apparatus. A flow direction arrow is shown with respect to the Duct Blaster® in FIG. 9.
2) Regarding the powered capture hood assembly, there are a total of four pressure taps, three on the nozzle structure and one on the Duct Blaster® apparatus. Two of the nozzle structure pressure taps are located at the venturi or constricted middle section and these taps are used to adjust the Duct Blaster® apparatus until these pressure taps read zero (null).
   Only one of the two taps located at the venturi is used for a single (Supply or Return) configuration. The tap marked "Supply" is only used here for this (Supply) configuration. The "Return" pressure tap is not used in this configuration. The remaining two taps, one on the Duct Blaster® apparatus and the fan reference tap on the nozzle structure are both used to derive the volumetric flow through the Duct Blaster® hence thru the powered capture hood assembly.

Return (Inlet) Configuration:
1) Flip the Duct Blaster® apparatus around from the Supply configuration. The flow rings (flow restrictor elements) are not sandwiched and instead, remain attached to the end of the Duct Blaster® apparatus.
2) Of the four pressure taps, the "Return" tap at the venturi of the nozzle structure is now used and the "Supply" is not, and functionally the tap's purpose is the same; as a nulling pressure. The "fan reference pressure tap" on the nozzle structure is also not used in this configuration.

Given the above referenced two configurations, the operation of the flow capture hood is as follows— While the air handler of the heating and cooling system is operational and the capture hood assembly is positioned over the return or supply opening, the adjustable fan of the powered capture hood assembly is adjusted so that the pressure reading at the appropriate "Supply" or "Return" port on the nozzle structure is zero or nulled. The volumetric flow estimate is then derived from the pressure difference of the flow sensor 57 pressure tap and the ambient room pressure. Thus, utilizing a pressure gauge, the measurement procedure is as follows:

Measuring Return Register and Exhaust Fan Inlet Flows
  Install Capture Hood and Zero Out The Nozzle Pressure
    Turn on the air handler fan (or exhaust fan), and place the capture hood tightly over a return register (or exhaust fan intake grill).
    Turn on the Duct Blaster® fan and slowly adjust the fan speed until the pressure on Channel A (the pressure difference between the formed nozzle Return tap and the local ambient room pressure) equals zero. Once adjusted, determine the flow through the Duct Blaster® fan by measuring the fan pressure on Channel B and using a flow table, or by using the digital pressure gauge's fan flow feature.
    The Duct Blaster® fan flow is the estimate of air flow through the return register (or exhaust fan) tested.
Measuring Supply Register Flows
  Install Capture Hood and Zero Out The Nozzle Pressure
    Turn on the air handler fan and place the capture hood of the assembly tightly over a supply register.
    Turn on the Duct Blaster® fan and slowly adjust the fan speed until the pressure on Channel A (the pressure difference between the formed nozzle Supply tap and the local ambient room pressure) equals zero. Once adjusted, determine the flow through the Duct Blaster® fan by measuring the fan pressure on Channel B and using the flow table, or by using the digital gauge's fan flow feature.
    The Duct Blaster® fan flow is the estimate of the air flow through the supply register.

As many changes are possible to the powered capture hood assembly of this invention utilizing the teachings thereof, the descriptions above, and the accompanying drawing should be interpreted in the illustrative and not in the limited sense.

That which is claimed is:

1. A powered capture hood assembly to measure volumetric airflow comprising:
  a) a hood structure for providing or capturing airflow;
  b) a formed nozzle structure having opposing first and second ends, said first end having means for connecting to said hood structure, said nozzle structure having a generally centrally disposed restricted area forming a venturi in said formed nozzle structure, said formed nozzle structure having a supply sensor and tap and a return sensor and tap;
  c) an airflow conditioning assembly disposed in said second end of said nozzle structure;
  d) a blower apparatus having an adjustable fan therein, said blower apparatus constructed for mounting to said second end of said formed nozzle structure, said blower apparatus having a pressure sensor and tap for sensing air flow;
  e) means to adjust the fan speed of said blower apparatus; and
  f) means to measure the pressure in said blower apparatus, said venturi portion of said nozzle structure and at said second end of said formed nozzle structure.

2. The powered capture hood assembly of claim 1, wherein said hood structure has a generally truncated pyramidal configuration and is formed of support members and a flexible material held by said support members.

3. The powered capture hood assembly of claim 1, wherein said formed nozzle structure has an airflow conditioning assembly disposed in said second end.

4. The powered capture hood assembly of claim 1, wherein said means to adjust the fan speed is a fan speed controller having an adjustment knob or a pressure gauge adapted to adjust fan speed.

5. The powered capture hood assembly of claim 1, wherein said means to measure pressure is a pressure gauge adapted to measure pressure differential.

6. The powered capture hood assembly of claim 1, wherein said blower apparatus has at least one handle structure mounted to the exterior thereof to enable a user to position said hood structure over a ventilation supply or a return duct.

7. The powered capture hood assembly of claim 1, wherein said airflow conditioning assembly includes an apertured honeycomb structure and an X shaped element.

8. The powered capture hood assembly of claim 1, wherein said hood structure is comprised of a pyramidal frame having a rectangular end frame and a fabric covering.

9. The powered capture hood assembly of claim 1, wherein said supply and return sensors are positioned within said formed nozzle structure at generally the restricted portion thereof.

10. A volumetric airflow measuring assembly for return and supply airflow measurements comprising:
  a) a housing structure with a tapered interior wall and having a reference, a supply and a return pressure sensing member, said housing further having exteriorly disposed pressure taps connected to each said pressure sensing member;
  b) flow conditioning devices positioned within said housing structure;
  c) a hood assembly mounted on one end of said housing structure;
  d) a pressure reading gauge mounted to the exterior of said housing structure; and
  e) means to connect a fan assembly on the end of said housing structure opposite said hood assembly.

11. The volumetric airflow measuring assembly of claim 10, wherein said housing structure has a formed nozzle structure with a generally centrally disposed restricted area.

12. The volumetric airflow measuring assembly of claim 10, wherein said hood assembly has a generally truncated pyramidal configuration.

13. The volumetric airflow measuring assembly of claim 10, wherein a fan assembly is mounted to said housing structure and wherein said fan assembly has means to adjust fan speed.

14. The volumetric airflow measuring assembly of claim 10, wherein said exteriorly disposed pressure taps include a reference pressure tap, a supply pressure tap and a return pressure tap.

15. The volumetric airflow measuring assembly of claim 13, wherein said fan assembly has at least one handle member mounted to the exterior thereof.

16. A process for measuring volumetric airflow for an air handler having a fan comprising:
  b) providing a powered capture hood assembly according to claim 1;

b) positioning said hood structure over an air supply duct or an air return duct;

c) providing a pressure gauge and interconnecting said pressure gauge to said supply tap or return tap of said formed nozzle structure and interconnecting said pressure tap of said blower apparatus and said reference tap on said nozzle structure to measure supply air pressure;

d) turning on the air handler fan;

e) turning on the fan of the blower apparatus and adjusting the fan speed until the pressure differential is zero between the formed nozzle structure and ambient pressure; and f) measuring the fan pressure of the blower apparatus and converting the pressure reading to determine volumetric airflow for the return air or supply air.

17. The process for measuring volumetric airflow of claim 16, wherein said pressure gauge provided is programmed to convert a pressure differential to volumetric airflow.

18. The process for measuring volumetric airflow of claim 16, wherein said hood structure is comprised of a truncated pyramidal configuration and formed of support members and a flexible covering material.

19. The process for measuring volumetric airflow of claim 16, wherein said formed nozzle structure provided has an airflow conditioning assembly disposed therein.

20. The process for measuring volumetric airflow of claim 16, wherein said formed nozzle structure provided has said supply and return pressure taps in communication within pressure sensors positioned at generally the restricted portion thereof.

* * * * *